United States Patent
Raskar et al.

(10) Patent No.: US 9,405,008 B2
(45) Date of Patent: Aug. 2, 2016

(54) METHODS AND APPARATUS FOR MULTI-FREQUENCY CAMERA

(71) Applicants: Ramesh Raskar, Cambridge, MA (US); Achuta Kadambi, Cambridge, MA (US); Ayush Bhandari, Cambridge, MA (US); Christopher Barsi, Exeter, NH (US)

(72) Inventors: Ramesh Raskar, Cambridge, MA (US); Achuta Kadambi, Cambridge, MA (US); Ayush Bhandari, Cambridge, MA (US); Christopher Barsi, Exeter, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 145 days.

(21) Appl. No.: 14/280,284

(22) Filed: May 16, 2014

(65) Prior Publication Data

US 2014/0340569 A1    Nov. 20, 2014

Related U.S. Application Data

(60) Provisional application No. 61/824,601, filed on May 17, 2013.

(51) Int. Cl.
*H04N 5/335*    (2011.01)
*H04N 5/222*    (2006.01)
*G01S 17/89*    (2006.01)
*G01S 7/493*    (2006.01)

(52) U.S. Cl.
CPC ........ *G01S 17/89* (2013.01); *G01S 7/493* (2013.01)

(58) Field of Classification Search
USPC ............... 348/96, 296–297, 280, 283, 505; 359/474, 483
See application file for complete search history.

(56) References Cited

U.S. PATENT DOCUMENTS

| 8,233,148 B2 | 7/2012 | Bodkin et al. |
| 8,406,859 B2 | 3/2013 | Zuzak et al. |
| 8,599,374 B1 | 12/2013 | Comstock, II et al. |
| 8,675,182 B2 * | 3/2014 | Bamji ............... G01S 7/497 356/3.01 |
| 2008/0106620 A1 * | 5/2008 | Sawachi ........... H04N 13/0257 348/262 |
| 2013/0234885 A1 * | 9/2013 | Geier ............... G01S 19/49 342/357.23 |
| 2014/0055771 A1 * | 2/2014 | Oggier ............. G01S 17/89 356/5.01 |
| 2014/0104464 A1 * | 4/2014 | Spears ............. H04N 9/04 348/272 |

OTHER PUBLICATIONS

Buttgen, B., et al. (2005), CCD/CMOS Lock-in pixel for range imaging: challenges, limitations and state-of-the-art. 1st Range Imaging Research Day, 2005, pp. 21-32.

Cheng, Q., et al. (2004), 'High-resolution and robust signal processing', A review of Parametric high-resolution methods, Chapter 1, pp. 1-62, Dekker 0824747526.

(Continued)

*Primary Examiner* — Trung Diep
(74) *Attorney, Agent, or Firm* — Stephen R. Otis

(57) ABSTRACT

In exemplary implementations of this invention, a multi-frequency ToF camera mitigates the effect of multi-path interference (MPI), and can calculate an accurate depth map despite MPI. A light source in the multi-frequency camera emits light in a temporal sequence of different frequencies. For example, the light source can emit a sequence of ten equidistant frequencies f=10 MHz, 20 MHz, 30 MHz, . . . , 100 MHz. At each frequency, a lock-in sensor within the ToF camera captures 4 frames. From these 4 frames, one or more processors compute, for each pixel in the sensor, a single complex number. The processors stack all of such complex quantities (one such complex number per pixel per frequency) and solve for the depth and intensity, using a spectral estimation technique.

19 Claims, 9 Drawing Sheets

(56) References Cited

OTHER PUBLICATIONS

Foix, S., et al. (2011), Lock-in Time-of-Flight (ToF) Cameras: A Survey. IEEE Sensors Journal, 2011, vol. 11, Issue 9, pp. 1917-1926.
Fuchs, S. (2010), Multipath interference compensation in time-of-flight camera images. Proceedings of 20th International Conference on Pattern Recognition (ICPR), pp. 3583-3586, IEEE, 2010.
Godbaz, J., et al. (2012). Closed-form inverses for the mixed pixel/multipath interference problem in AMCW lidar. Proc. SPIE 8296, Computational Imaging X, vol. 829618, pp. 829618-1 to 829618-15 (Feb. 9, 2012).
Godbaz, J., et al. (2012). Understanding and Ameliorating Non-Linear Phase and Amplitude Responses in AMCW Lidar. Remote Sens. 2012, vol. 4, issue 1, 21-42.
Hua, Y., et al., 1990, Matrix pencil method for estimating parameters of exponentially damped/undamped sinusoids in noise. IEEE Transactions on Acoustics, Speech and Signal Processing, vol. 38, No. 5, pp. 814-824, May 1990.
Plaza, A., et al., 2004. A new approach to mixed pixel classification of hyperspectral imagery based on extended morphological profiles. Pattern Recognition, 37(6), 1097-1116.

\* cited by examiner

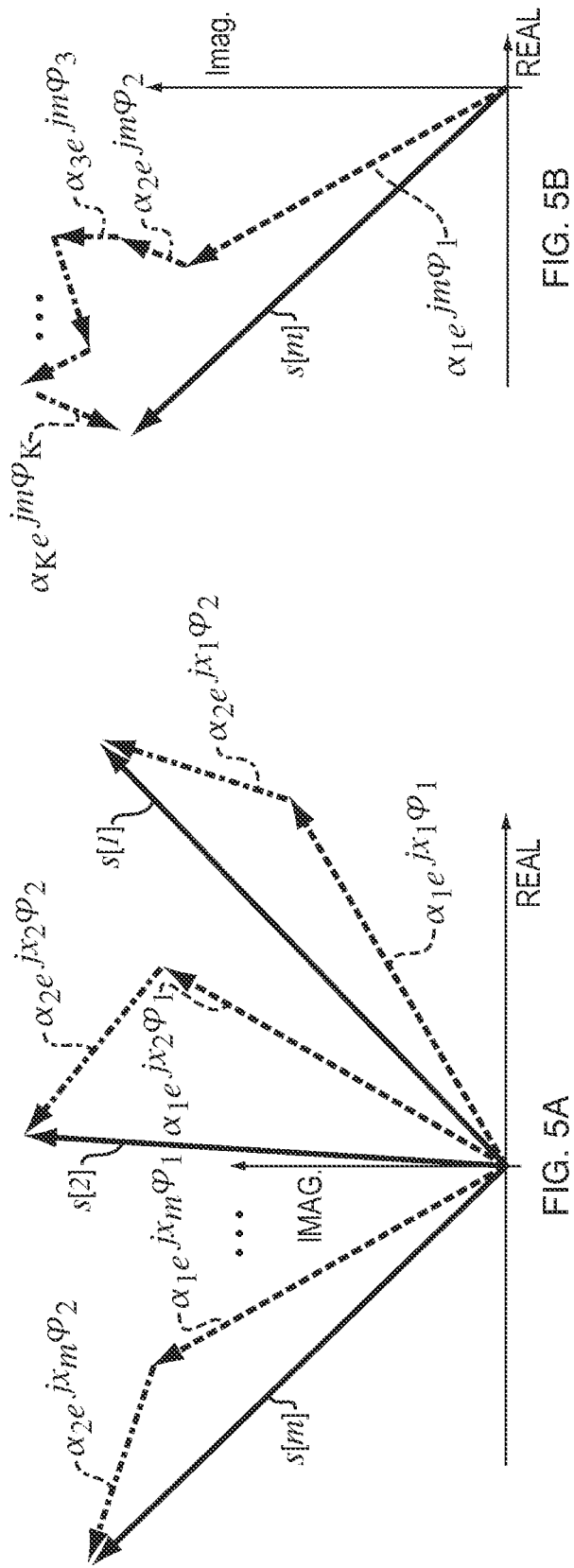

METHODS AND APPARATUS FOR MULTI-FREQUENCY CAMERA

RELATED APPLICATIONS

This application is a non-provisional of, and claims the benefit of the filing date of, U.S. Provisional Application No. 61/824,601, filed May 17, 2013, the entire disclosure of which is herein incorporated by reference.

STATEMENT REGARDING FEDERALLY SPONSORED RESEARCH OR DEVELOPMENT

This invention was made with government support under Grant No. IIS-115680 awarded by the National Science Foundation and under Grant No. N66001-10-1-4041 awarded by the Space & Naval Warfare Systems Center. The government has certain rights in the invention.

FIELD OF THE TECHNOLOGY

The present invention relates generally to cameras.

SUMMARY

In conventional time-of-flight (ToF) cameras, multipath interference can corrupt a depth measurement. Multipath interference (MPI) arises when light from the ToF camera travels along different paths with different path lengths and then strikes a single pixel in the lock-in sensor. The phases of light for the different path lengths are different. A conventional ToF camera integrates the light from the different paths, and thus computes an inaccurate phase and an inaccurate depth.

In exemplary implementations of this invention, a multi-frequency ToF camera mitigates the effect of MPI. Even when light with different path lengths strikes single pixels, the multi-frequency ToF camera can calculate an accurate depth map, at least if the path lengths are along single-bounce paths.

In exemplary implementations of this invention, a light source in the multi-frequency camera emits modulated light in a temporal sequence of different frequencies. For example, the light source can emit a sequence of ten equidistant frequencies f=10 MHz, 20 MHz, 30 MHz, ..., 100 MHz. At each frequency, a lock-in sensor within the ToF camera captures 4 frames. From these 4 frames, one or more processors compute, for each pixel in the lock-in sensor, a single complex number. Thus, the processors compute one such complex quantity per pixel per frequency. The processors then stack all of such complex quantities (one such complex number per pixel per frequency) and solve for the depth and intensity.

In an illustrative embodiment of this invention, a multi-frequency camera emits modulated light in a temporal sequence of m different frequencies: $x_1, x_2, \ldots, x_m$. First, it emits frequency $x_1$, then it emits frequency $x_2$, and so on. The frequencies are evenly spaced (in frequency): e.g., 10 MHz, 20 MHz and so on. For each respective frequency in the sequence, a lock-in sensor captures multiple frames (e.g., four frames). From these multiple frames, one or more processors compute a single complex number per pixel for that respective frequency, which complex number can be expressed as a phasor. For example, for a single pixel at a single frequency, one or more processors may compute a complex quantity $s[m]$, which is a sum of the terms for the respective path lengths:

$$s[m] = \alpha_1 e^{jm\phi_1} + \alpha_2 e^{jm\phi_2} + \alpha_3 e^{jm\phi_3} + \ldots + \alpha_K e^{jm\phi_K}$$

where $\alpha_1, \alpha_2, \ldots, \alpha_K$ are the amplitudes for the respective path lengths, $\phi_1, \phi_2, \ldots, \phi_K$ are the phases for the respective path lengths, and m is the frequency at which these particular measurements were taken.

In some implementations of this invention, one or more processors perform computations (such as the formula immediately above) that take into account a set of K path-lengths for each respective pixel in the light sensor, which sets of K path-lengths may vary from pixel to pixel. In some other implementations, a single set of K path-lengths is used for all of the pixels in the light sensor.

In most scenarios, the measurements taken during the frequency sweep are noisy. One or more processors start with data from these noisy measurements, and calculate the phase values and amplitudes (or coefficients of reflection) for a set of path lengths: e.g., the phase and amplitude for the first path, the phase and amplitude for the second path, and so on. To do so, one or more processors execute an algorithm that computes a high resolution estimation of frequency components of a signal.

For example, the algorithm may employ any of the following spectral estimation techniques: (a) matrix pencils; (b) Prony's Method; (c) MUSIC (multiple signal characterization), including spectral MUSIC and root MUSIC; (d) subspace rotation invariance methods, including ESPRIT (estimation of signal parameters by rotational invariance techniques), (e) maximum likelihood methods, including IQML (iterative quadratic maximum likelihood), UML (unconditional maximum likelihood), and CML (conditional maximum likelihood); (f) any other parametric method of spectral estimation; or (g) any other method of line spectral estimation.

Furthermore, the one or more processors may use the computed phases to calculate the path lengths, and thus to calculate a depth map of a scene.

The description of the present invention in the Summary and Abstract sections hereof is just a summary. It is intended only to give a general introduction to some illustrative implementations of this invention. It does not describe all of the details of this invention. This invention may be implemented in many other ways. Likewise, the description of this invention in the Field of the Technology section is not limiting; instead it identifies, in a general, non-exclusive manner, a field of technology to which exemplary implementations of this invention generally relate.

BRIEF DESCRIPTION OF THE DRAWINGS

FIG. 5A is a conceptual diagram that shows complex quantities computed from measurements taken during a frequency sweep.

FIG. 5B is a conceptual diagram that shows decomposition of global components, even when there are more than two light path lengths.

The above Figures show some illustrative implementations of this invention, or provide information that relates to those implementations. However, this invention may be implemented in many other ways. The above Figures do not show all of the details of this invention.

DETAILED DESCRIPTION

A conventional approach in time-of-flight (ToF) cameras uses amplitude-modulated continuous wave illumination of a scene. Homodyne detection records the phase of the reflected modulation signal and computes depths based on the resultant path length. Unfortunately, when multiple reflections are detected by a single pixel, as in the case of global light transport and multi-path interference, the calculated phase is incorrect.

In exemplary implementations of this invention, spectral estimation techniques are used to decompose such "mixed pixels" into direct and global components. By using frequency diversity, more accurate range maps can be reconstructed. Further, the technique generalizes to decompose the global components into arbitrarily higher order inter-reflections and scattering.

Figure 1B:
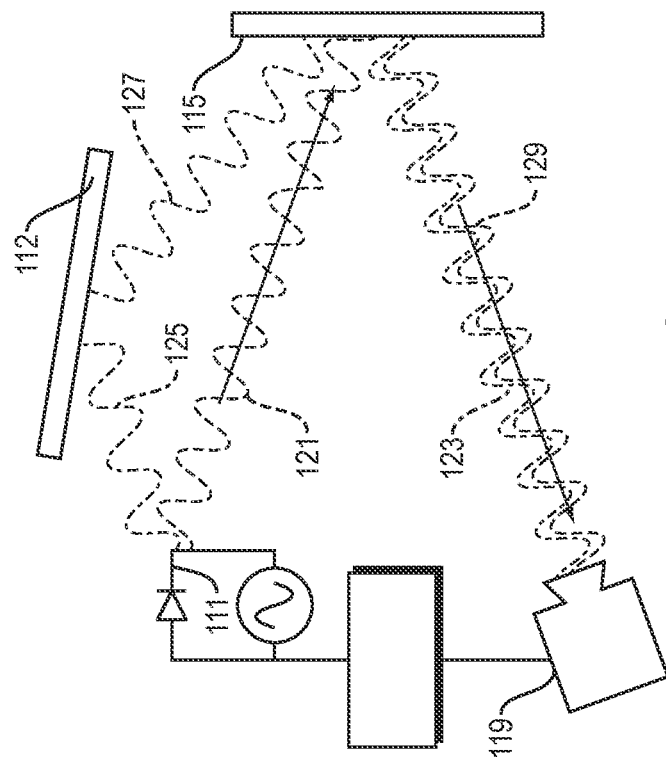
FIG. 1B is a conceptual diagram that shows an example of ToF depth measurement, in which multi-path interference (MPI) occurs.
Figure 1A:
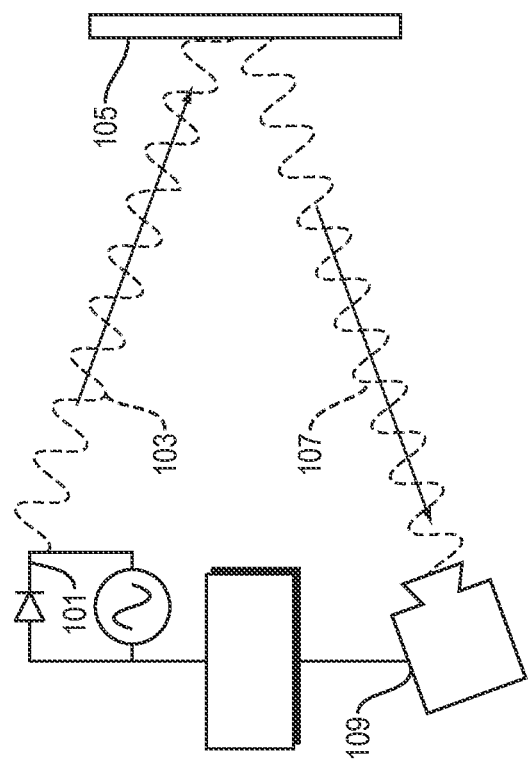
FIG. 1A is a conceptual diagram that shows an example of ToF depth measurement, with a single-bounce path.

Conventional ToF ranging has a severe systematic error: it assumes that the light travels directly between the camera and the object, as in FIG. 1A. However, because the ToF camera illuminates the entire scene, multiple paths can contribute to a measurement. This multi-path interference (MPI) corrupts the depth measurement, which comprises a nonlinear combination of the components. This is possible even for simple two-object scenes, such as the scene shown in FIG. 1B. For the scene shown in FIG. 1B, a conventional ToF camera would measure direct and indirect signals simultaneously to produce a phase measurement that yields an incorrect depth with a converted distance somewhere between the two objects. In such and similar scenarios, the camera measures a nonlinear mixture of rays. Within the time-of-flight community, this challenge is referred to as "multi-path" or "multi-return" interference.

FIG. 1A is a conceptual diagram that shows an example of ToF depth measurement, with a single-bounce path. A light source 101 emits an amplitude modulated near-infrared (NIR) signal 103. The signal 103 comprises a continuous wave illumination strobed at a high frequency. This light signal 103 illuminates a scene 105, and is reflected back to the ToF camera. The reflected light 107 is captured by a lock-in sensor 109 in the ToF camera.

A conventional ToF camera is an active sensor that can provide range maps at framerates over 100 fps. This conventional ToF camera can measure both phase and amplitude: a phase shift represents the round-trip travel time of light, while the amplitude represents the strength of the modulated signal. A calculation (Eqn. 1 below) converts the phase measurement to a distance. In the single-path example shown in FIG. 1A, phase measurement would produce a correct measurement of depth, even for a conventional ToF camera.

FIG. 1B is a conceptual diagram that shows an example of ToF depth measurement, in which multi-path interference (MPI) occurs. In this example, MPI would cause a conventional ToF camera to produce an incorrect phase measurement and an incorrect measurement of depth. A light source 111 emits light that illuminates a scene 115 and reflects back to a lock-in sensor 119 in a ToF camera. The light travels in multiple paths, including a first path consisting of path segments 125, 127, 129, and a second path consisting of path segments 121, 123. The first path reflects off both surface 112 and surface 115; whereas the second path reflects off only surface 115. The reflected light in path segments 123 and 129 have different phases. A conventional ToF camera would integrate the light from those two paths, resulting in an incorrect phase measurement and incorrect calculated range.

Figure 2A:
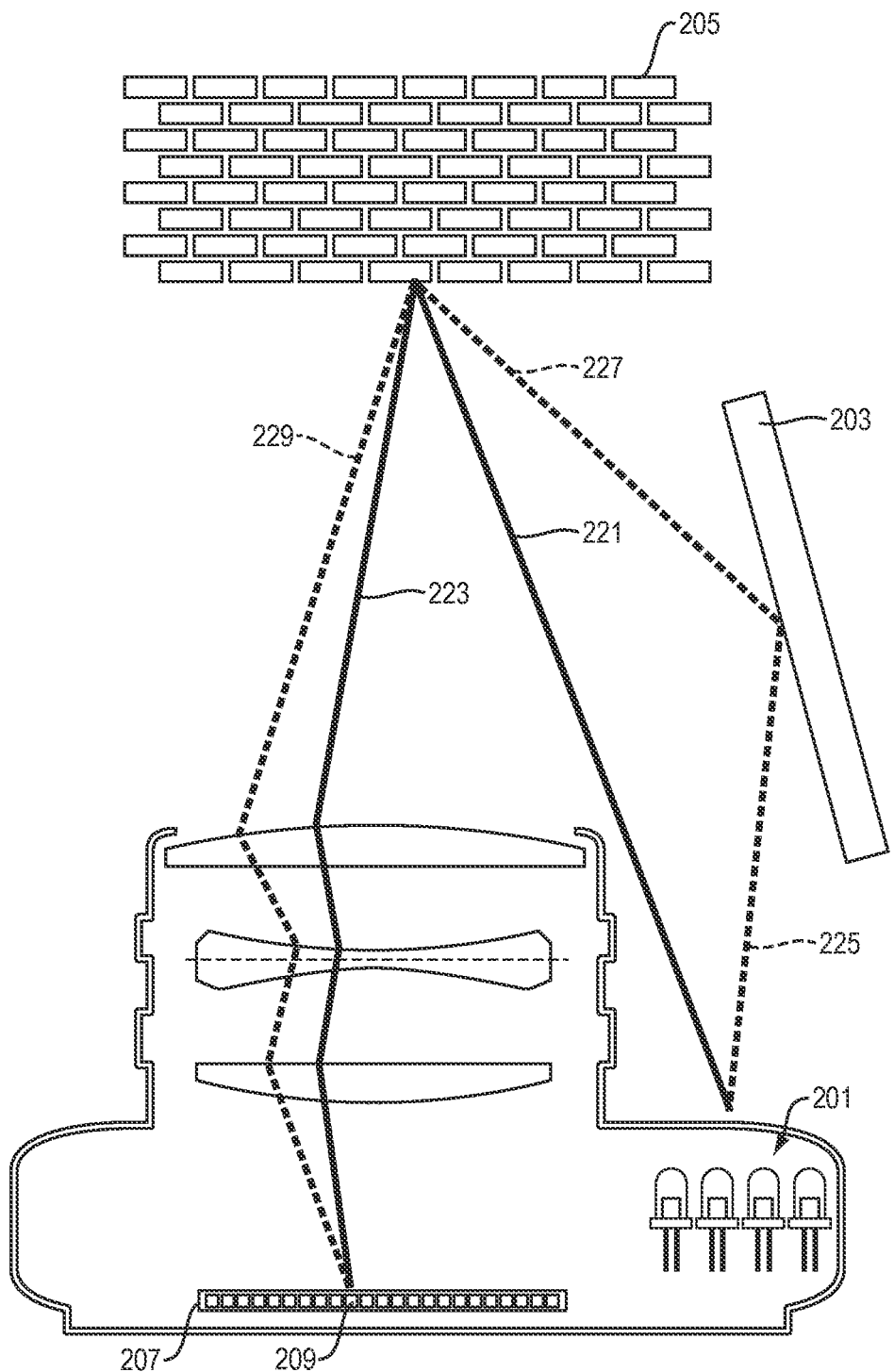
FIG. 2A is a conceptual diagram of an example in which MPI occurs in a scene with a specular reflector.
Figure 2B:
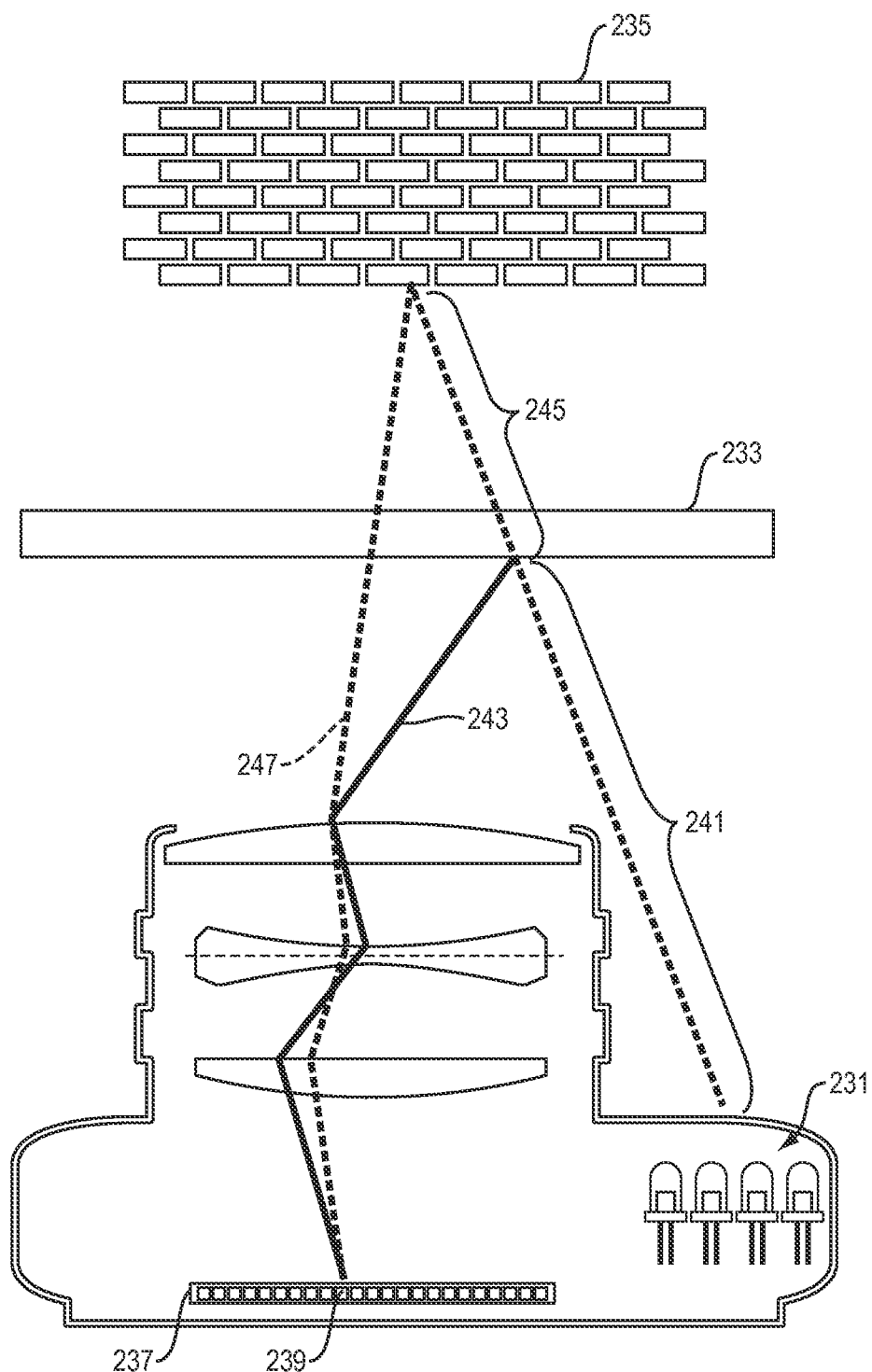
FIG. 2B is a conceptual diagram of an example in which MPI occurs in a scene with a translucent sheet in the foreground of the scene.
Figure 2C:
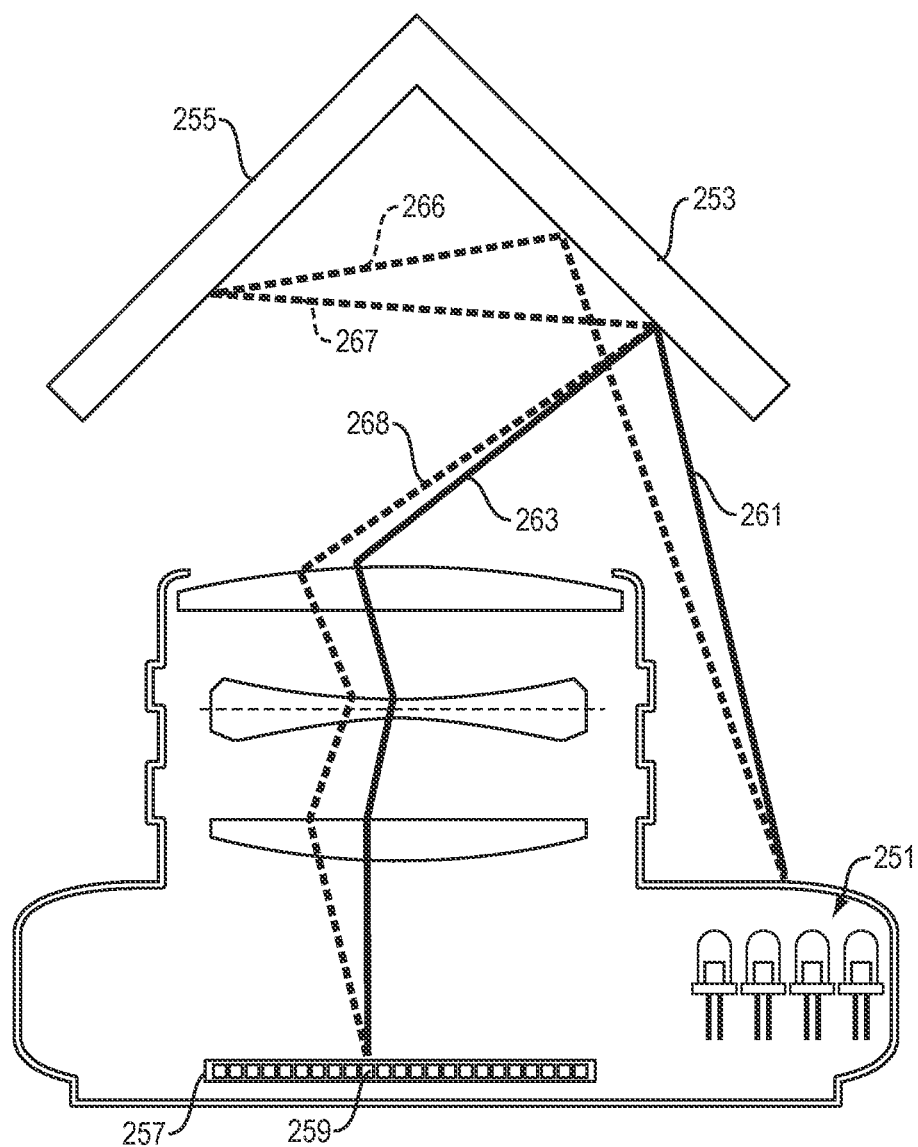
FIG. 2C is a conceptual diagram of an example in which MPI occurs in a scene with a corner.

FIGS. 2A, 2B, 2C show examples of ToF camera taking range measurements of these three common scene types. In FIGS. 2B and 2C, MPI would cause a conventional ToF camera to take incorrect phase measurements and thus incorrect range measurements.

However, in exemplary implementations of this invention, a multi-frequency ToF camera may be used to mitigate the effect of MPI. The multi-frequency ToF camera emits a sequence of different frequencies and computes depth maps at these different frequencies, and can accurately estimate depth even in the presence of MPI. For example, the multi-frequency camera may correctly determine depth even in the examples shown in FIGS. 2B and 2C, where MPI is present.

FIG. 2A is a conceptual diagram of an example in which MPI occurs in a scene with a specular reflector. In the example shown in FIG. 2A, light travels from a light source 201 to a scene and then back to a light sensor 207. The light travels in multiple paths, including a first path and a second path. The first path includes path segments 221 and 223, and reflects off only an opaque object 205 in the scene. The second path includes path segments 225, 227 and 229, and bounces off both the opaque object 205 and a specular reflector 203 in the scene.

FIG. 2B is a conceptual diagram of an example in which MPI occurs in a scene with a translucent sheet in the foreground of the scene. In the example shown in FIG. 2B, light travels from a light source 231 to a scene and then back to a light sensor 237. The light travels in multiple paths, including a first path and a second path. The first path includes path segments 241 and 243, and reflects off only a translucent sheet 233 in the foreground of a scene. The second path includes path segments 241, 245 and 247, and bounces off both an opaque object 235 and the translucent sheet 233.

FIG. 2C is a conceptual diagram of an example in which MPI occurs in a scene with a corner. In the example shown in FIG. 2C, light travels from a light source 251 to a scene and then back to a light sensor 257. The light travels in multiple paths, including a first path and a second path. The first path includes path segments 261 and 263, and reflects off only a first wall 253. The second path includes path segments 266, 267 and 268, and bounces off both a second wall 255 and the first wall 253.

In the examples shown in FIGS. 2A, 2B and 2C, at least some of the pixels each, respectively, receive light that travels on more than one path (i.e., at least some of the pixels are so-called "mixed pixels"). For example, a single pixel (such as 209, 239, or 259) can receive light that travels on multiple paths with different path lengths.

In exemplary implementations of this invention, a multi-frequency ToF camera sequentially emits light at different frequencies: first, it emits light at a first frequency, then it emits light at a second frequency, and so on. For example, the different frequencies in the sequence may be uniformly spaced (in frequency). A lock-in sensor in the multi-frequency ToF camera captures data at the different frequencies.

This approach increases the dimensionality of the measurement, and can be used to mitigate the effects of MPI.

In exemplary implementations of this invention, multi-spectral estimation is to construct accurate depth maps, even in the present of MPI. The frequency is varied, in a temporal sequence of different frequencies. One of more processors perform an algorithm that can decompose global and direct light to mitigate MPI for accurate depth maps. Further, the algorithm can be used to separate individual global components (e.g., separate multiple components illuminating a single pixel).

In exemplary implementations of this invention, one or more processors perform algorithms: (a) to mitigate MPI by using spectral estimation; (b) to unmix component phases and compute corresponding amplitudes; (c) to perform per-pixel unmixing of a measured range image; (d) to acquire depth maps at different frequencies, (e) to disentangle phases and amplitudes; and (f) to consider only the direct component. These algorithms can be used to increase the accuracy of time of flight range maps, as compared to conventional ToF cameras.

A ToF camera measures depth by emitting an amplitude modulated intensity at frequency $f_m$: $A(t)=A_0 \cos(2\pi f_m t)$. The reflected signal is shifted by a phase that depends upon the total propagation distance: $s(t)=A \cos(2\pi f_m t+\Phi)$. This signal is correlated with a reference, and the phase difference $\Phi$ is proportional to the depth d (with c as the speed of light), $$d = \frac{c\Phi}{4\pi f_m} \quad (1)$$

In exemplary implementations of this invention, the ToF camera illuminates the entire scene, and a pixel can record contributions from both direct and global light. (For example, in the scene shown in FIG. 4, a semi-transparent object is located at Plane 1 and an opaque object is located at Plane 2. The sensor will record a phasor that is a sum of each component, one from the semi-transparent object in Plane 1, and the other from the opaque object at Plane 2).

Figure 3:
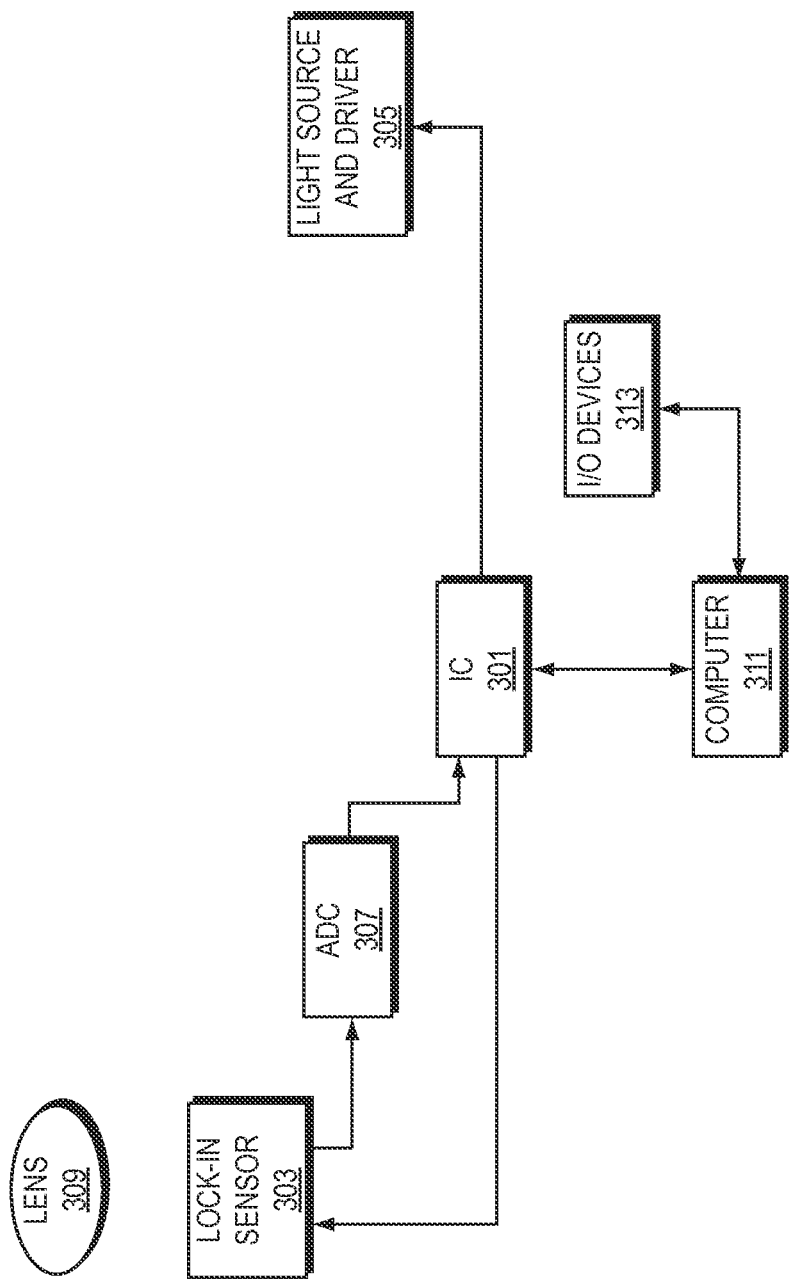
FIG. 3 shows hardware elements used in a multi-frequency ToF camera.

In the example shown in FIG. 3, MPI is present: although the addition is linear in the complex plane, the measured phase $\Phi$, is a nonlinear combination of the component amplitudes and phases. Thus, the calculated depth (Eqn. 1) will yield an incorrect value d★, such that $d_1<d★<d_2$. In general, higher order bounces can contribute to d★ as well.

In exemplary implementations of this invention, a light sensor observes a sum of K-complex exponential functions at equidistant frequency spacings. (That is, the functions have different frequencies that are uniformly spaced in frequency.) Mathematically, this amounts to sampling or observing a continuous function based on the canonical variable $x \in \mathbb{R}$, $$s(x) = \sum_{k=0}^{K-1} \alpha_k e^{+j\varphi_k x}, \forall\, x \in \mathbb{R} \quad (2)$$

at instants $x_m=m$, $m \in \mathbb{Z}$ so that $s[m]=s(x)|_{x=x_m}$.

The frequencies at which the values of s(x) are observed are equidistant (in frequency) but not necessarily integer valued. For example, the frequencies may be, but are not necessarily, integer values of Hertz or radians/second.

Each sample taken at a single pixel for a particular frequency m may be described as:

$$s[m] = \sum_{k=0}^{K-1} \alpha_k e^{j\varphi_k m}$$

where $\alpha_k$ and $\phi_k$ represent the amplitude and phase, respectively, for path length k.

In vector-matrix notation, $s^{(N \times 1)} = V^{(N \times K)} \alpha^{K \times 1}$ with, $$\begin{bmatrix} s(x_1) \\ \vdots \\ s(x_N) \end{bmatrix} = \begin{bmatrix} e^{+j\varphi_1 x_1} & \cdots & e^{+j\varphi_K x_1} \\ \vdots & \ddots & \vdots \\ e^{+j\varphi_1 x_N} & \cdots & e^{+j\varphi_K x_N} \end{bmatrix} \begin{bmatrix} \alpha_1 \\ \vdots \\ \alpha_K \end{bmatrix}$$

where $x_1, x_2, \ldots, x_m$ are frequencies, $\alpha_1, \alpha_2, \ldots, \alpha_m$ are amplitudes for respective path lengths, $\phi_1, \phi_2, \ldots, \phi_m$ are phases for respective path lengths, and V is the Vandermonde matrix which encodes the phase information.

In exemplary implementations of this invention, given measurements s[m], in $m \in \mathbb{Z}$, one or more processors estimate the 2K parameters $\{\alpha_k, \phi_k\}_{k=0}^{K-1}$, $\alpha=[\alpha_0, \alpha_1, \ldots \alpha_{K-1}]^T$ and $\phi=[\phi_0, \phi_1, \ldots, \phi_{K-1}]^T$ Noiseless case:

These parameters ($\alpha$, $\phi$) can, in the noiseless case, be accurately estimated as follows:

Let p be a sequence in $l_2$ or, $\|p\|_{l^2}^2 = \Sigma_k |p| < \infty$ and let * denote the discrete convolution operator such that $(p*q)[m]=\Sigma_k p[k] q[m-k]$. Define the Z-transform of the sequence $\{p\}_m$ by the polynomial:

$\forall z \in \mathbb{C},\ \hat{P}(z) \triangleq \Sigma_{m=0}^{K} p_m z^{-m} = \Pi_{k=0}^{K-1}(1-\mu_k z^{-1})$ where $\mu_k = e^{j\Phi_k}$.

Observe that:

$$(p*s)[m] = 0 \Leftrightarrow \underbrace{\sum_{l=0}^{l=K}(p[l]e^{-j\phi_k l})}_{\hat{P}(\mu_k)} = 0$$

This is because $$(p*s)_m = \sum_{k=0}^{K-1}\sum_{l=0}^{l=K}(p[l]e^{-j\phi_k l})(\alpha_k e^{j\phi_k m}).$$

Consequently, the filter p encodes the phases $\phi$ in roots of the polynomial $\hat{P}(z)$. Once the $\mu_k$'s have been identified, one or more processors compute $\alpha$ which is done by computing the pseudo-inverse of V by $\alpha=V^\dagger s$. From the implementation perspective, the filter p can be easily computed by considering the null-space of the Toeplitz matrix constructed using the measurements s. The representation $s(x)=\Sigma_{k=0}^{K-1}\alpha_k e^{+j\Phi_k x}$ is an exact Fourier series decomposition when $\phi_k=k\phi_0=2\pi k$, in which case Parseval's equality applies: $\|s\|_{L_2[-\pi,\pi]}^2 = \|\alpha\|_{l_2}^2$. However, the family of non-harmonic functions $\{e^{j\Phi_k x}\}_k$ is neither orthogonal nor a basis. It is desirable that $\{e^{j\Phi_k x}\}_k$ forms a Riesz basis.

Noisy Case:

While the above method for estimating $\{\alpha, \phi\}$ is exact for the noiseless setting (whenever $\phi_j \neq \phi_k$, $\forall j \neq k$), one of the bottlenecks in the noisy setting is that the inverses of V and $V^\dagger$ are highly unstable because of ill-conditioned Vandermonde matrices.

One way of circumventing this problem is to use the composite mapping property (CMP). CMP employs model priors and signal properties to force a structure onto the measurements. In implementing $p*s=0 \Rightarrow Sp=0$, a Toeplitz (or Hankel) matrix linked with s can be computed. Indeed, in case of oversampling, the matrix is rank-constrained with the maximum rank not exceeding K. Hence, whenever the number of measurements exceed the number K, the matrix S can be denoised by constraining its rank to K. It is desirable to force $p*s=0 \Rightarrow Sp=0$. Whenever S is not Toeplitz, the Toeplitz structure can be forced by averaging the diagonals. The two operations form a closed-mapping, hence the scheme converges.

In some implementations of this invention, a Matrix Pencil method is used introduced to recover K-exponentials buried in additive white Gaussian noise (AWGN). For example, a Matrix Pencil method may be employed as follows:

A light sensor captures noisy measurements:

$$y[m] = s[m] + \eta[m] \Leftrightarrow y = \underbrace{V\alpha}_{s} + n$$

where $S = V\alpha$ is the noise free signal and $n = [\eta_0, \ldots, \eta_{N-1}]^T \in \mathbb{C}^N$ is the vector of Gaussian i.i.d. (independent and identically distributed) samples. Label $L \in [K, N-K]$ as the Matrix-Pencil parameter and define the vector:

$$\{y_m\}_{m=0}^{m=L} = [y[m], y[m+1], \ldots, y[N-L+m-1]]^T.$$

From the vector, construct matrices:

$$Y_0^{2(N-L)\times(L+1)} = \begin{bmatrix} y_0 & y_1 & \cdots & y_{L-1} \\ y_L^* & y_{L-1}^* & \cdots & y_0^* \end{bmatrix},$$

$$\begin{bmatrix} Y_1^{2(N-L)\times(L+1)} \end{bmatrix} = \begin{bmatrix} y_1 & y_1 & \cdots & y_L \\ y_{L-1}^* & y_{L-2}^* & \cdots & y_0^* \end{bmatrix}.$$

For a rectangular matrix Y, define the best-K term truncation operator $\mathcal{T}(\bullet)$ as, $$\mathcal{T}_{!K}\{Y\} = \sum_{k=1}^{K} \lambda_k u_k v_k^H = U \sum V^H \big|_K,$$

$$K \leq L,$$

which synthesizes Y with K-dominant eigen values $\Sigma = \text{diag}\{\lambda_1, \lambda_2, \ldots, \lambda_K\}$ and where u and v are the corresponding left and right singular vectors (and U, V matrices), respectively. Also define the pseudo-inverse by $Y^\dagger = V\Sigma^{-1}U^H$.

A Matrix-Pencil method can then retrieve phase parameters $\phi$ by solving a generalized eigen value problem for the matrix $\tilde{Y}$, $$\tilde{Y} = (\mathcal{T}_K\{Y_1\})^\dagger \mathcal{T}_K\{Y_0\}$$

In Matlab®, the K-eigen values can be obtained by $\text{eig}(\tilde{Y})$.

The following is a detailed description of an example of this invention. In this example, phases and amplitudes are recovered from the measurements, and the Composite Mapping Property (CMP) is incorporated in the estimation algorithm.

In this example, start with measurements $s(x_k)|_{k=0}^N$, $N > 2\eta K + 1$ where K is the number of return paths/interfering paths to be estimated, $\eta$ is the oversampling factor with minimum value $\eta_{min} = 1$, and N is the number of frequencies in the temporal sequence of frequencies.

Since the frequencies $x_m$'s are equidistant, $x_m = m$ is used interchangeably.

Given discrete measurements $s(\xi)|_{\xi = m \in \mathbb{Z}}$ of a K-component parametric function, $$\forall \xi \in \mathbb{R},$$

$$s(\xi) = \sum_{k=0}^{K-1} \alpha_k e^{j\phi_k \xi} \xleftrightarrow{\text{sampled}} s[m] = \sum_{k=0}^{K-1} \alpha_k e^{j\phi_k m},$$

$$\forall m \in \mathbb{Z}$$

with parameters $\{\alpha_k, \phi_k\}_{k=0}^{K-1}$, estimate $\alpha = [\alpha_0, \alpha_1, \ldots, \alpha_{K-1}]^T$ and $\phi = [\phi_0, \phi_1, \ldots, \phi_{K-1}]^T$.

Each measurement accounts for one ordered pair $\{\alpha_k, \phi_k\}$ so $N \geq 2K+1$ samples of $s(\xi)$ are used.

Consider the polynomial $$\forall z \in \mathbb{C},$$

$$P(z) = \sum_{m=0}^{K} p_m z^{-m} = \prod_{k=0}^{K-1} (1 - \mu_k z^{-1})$$

where $\mu_k = e^{j\phi_k}$.

Note that:

$$(p*s)[m] = \sum_{l=0}^{l=K} p_l s(m-l)$$

$$= \sum_{l=0}^{l=K} p_l s(m-l)$$

$$= \sum_{l=0}^{l=K} p_l \sum_{k=0}^{K-1} \alpha_k e^{j\phi_k(m-l)}$$

$$= \sum_{k=0}^{K-1} \underbrace{\left(\sum_{l=0}^{l=K} p_l \mu_k^{-l}\right)}_{\Rightarrow P(\mu_k)=0} \alpha_k e^{j\phi_k m} = 0.$$

Therefore zeros of the polynomial P(z) encode the phase locations. What remains is the Vandermonde matrix relation:

$$\begin{bmatrix} s[0] \\ \vdots \\ s[K] \end{bmatrix} = \begin{bmatrix} 1 & 1 & \cdots & 1 \\ \mu_0 & \mu_1 & \cdots & \mu_{K-1} \\ \vdots & \vdots & \cdots & \\ \mu_0^{K-1} & \mu_1^{K-1} & \cdots & \mu_{K-1}^{K-1} \end{bmatrix} \begin{bmatrix} \alpha[0] \\ \vdots \\ \alpha[K] \end{bmatrix} \Leftrightarrow s = V\alpha,$$

where V is the classic Vandermonde matrix.

Given V of form:

$$V_n = \begin{bmatrix} v_1 & v_2 & \cdots & v_n \\ v_1^2 & v_2^2 & \cdots & v_n^2 \\ \vdots & \vdots & \ddots & \vdots \\ v_1^n & v_2^n & \cdots & v_n^n \end{bmatrix},$$

its element-wise inverse, $V_n^{-1}=[b_{i,j}]$ is defined as:

$$b_{ij} = \frac{\sum_{\substack{0 \le m_0 < \ldots < m_{n-i} \le n \\ m_0,\ldots,m_{n-i} \ne j}} (-1)^{j-1} v_{m_0} \ldots v_{m_{n-i}}}{x_i \prod_{\substack{0 \le m \le n \\ m \ne j}} (v_m - x_j)}.$$

The Vandermonde inverses can be highly unstable. In presence of noise $v_m$ can be arbitrarily close to $v_j$, causing the inverses to be blow up. In this context, the CPM technique can be helpful.

A goal is to solve for $$(p^*s)_m = \sum_{k=0}^{K-1} p[k]s[m-k] = 0, |m| < M \in \mathbb{Z}$$

The resultant p encodes the phase information. An alternative Toeplitz matrix formulation can be used, which is equivalent to the convolution:

$$(p^*s)_m = \sum_{k=0}^{K-1} p[k]s[m-k] \Leftrightarrow Sp = \begin{bmatrix} s[-M+K] & \ldots & s[-M] \\ \vdots & \ddots & \vdots \\ s[M] & \ldots & s[M-K] \end{bmatrix} \begin{bmatrix} p[0] \\ p[K] \end{bmatrix}.$$

Choose K<L<M and let $$\mathcal{M} = \{M \in \mathbb{C}^{(N-L) \times (L+1)}\}$$

be a set of all complex matrices of size (N−L)×(L+1).

Let $\mathcal{T}$ and $\mathcal{T}_K$ be subsets of $\mathcal{M}$ where $\mathcal{T}$ is a Toeplitz subset $\mathcal{M}$ and $\mathcal{T}_K$ is a rank-K subset of $\mathcal{M}$. Identify projections:

$$\mathcal{P}_\mathcal{T} = \frac{1}{|\text{diag}(S)|} \sum_k s_{k,k}$$

Diagonal averaging of Toeplitz Matrix S, and $$\mathcal{P}_{\mathcal{T}_K} = \sum_{k=1}^{K} \lambda_k u_k v_k^H = U \sum V^H |_K$$

rank—K approximation of S.

The alternating projections are carried out as $$S^{(m)} \to \boxed{S_K^{(m)} = \mathcal{P}_{\mathcal{T}_K}\{S^{(k)}\}} \to \boxed{\mathcal{P}_\mathcal{T}\{S_K^{(m)}\}} \to S^{(m+1)}$$

where, for the initialization we use m=0, $S^{(0)}=S$.

The denoised, almost Toeplitz matrix with rank K is identified as $$S^\star = S^{(20\text{-}50)} \in \mathcal{P}_{\mathcal{T}_K} \cap \mathcal{P}_\mathcal{T}.$$

For example, 20 to 50 iterations may be used to find $S^\star$.

For the noisy case, to benefit from the CMP, oversampling is desirable. While η=1 gives perfect results, it does so only for the noiseless case. For the case of noise, η>2 is preferable.

This invention is not limited to the above example, which incorporates CMP in the estimation. This invention may be implemented in many other ways.

FIG. 3 shows hardware elements used in a multi-frequency ToF camera, in an illustrative implementation of this invention. In the example shown in FIG. 3: An integrated circuit 301 generates a signal that (a) is sent to a light source and driver 305 to control light emitted by the light source, and (b) is also sent as a reference signal to a lock-in sensor 303. For example, the IC 301 may comprise a field programmable gate array or a microcontroller. The light source generates modulated light. For example, the modulated light may comprise a continuous wave light signal. The light illuminates a scene and is reflected back to the camera (e.g., in multiple paths, some direct and some indirect). Light reflected from the scene is focused by a lens 309 onto the lock-in sensor 303. An analog-to-digital converter (ADC) 307 converts analog sensor readings from the lock-in sensor 303 into a digital signal and sends the digital signal to the IC 301. The IC 301 communicates with a computer 311. The computer 311 performs computations, including analyzing data and calculating depth maps. The computer 311 accepts input and displays output in humanly perceptible format via one or more I/O (input/output) devices 313, including a monitor screen, a mouse and a keyboard.

In exemplary implementations of this invention, the frequencies in the temporal sequence are frequencies of a continuous wave function emitted by a light source, and are not the frequency of a strobe. Indeed, in illustrative implementations of this invention, the light is not strobed. Alternatively, in some implementations, the light can be strobed.

In some embodiments of this invention, a light source with a tunable frequency (e.g., a frequency tunable laser) is used to emit the temporal sequence of frequencies. Alternatively, a set of light sources, each with a different fixed frequency, can be used to emit the temporal sequence of frequencies. For example, the light source and driver 305 in FIG. 3 may include either (a) a set of multiple light sources, each respective light source in the set having a fixed frequency, or (b) a frequency tunable light source.

Figure 4:
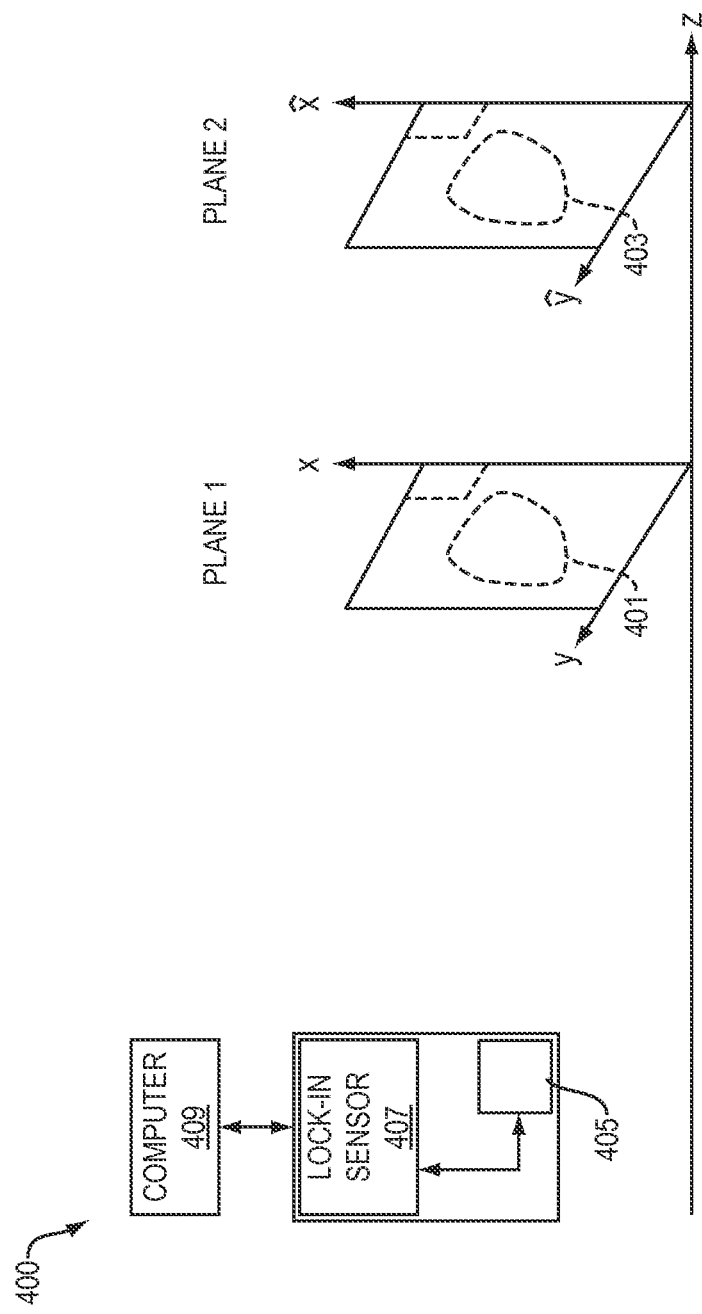
FIG. 4 shows an example of a multi-frequency ToF camera taking depth measurements of a scene.

FIG. 4 shows an example of a multi-frequency ToF camera taking depth measurements of a scene. In the example shown in FIG. 4, a scene comprises two planes: Plane 1 and Plane 2. A semi-transparent object 401 is located at Plane 1; an opaque object 403 is located at Plane 2. The ToF camera 400 records light from both the semi-transparent object 401 in the foreground and the opaque object in the background. Some of the light reflects directly back from the semi-transparent object 401; and some of the light travels through the semi-transparent object, to the opaque object, and then back through the semi-transparent object to the ToF camera. The multi-frequency ToF camera 400 includes optics (including a lens) 405, a lock-in sensor 407, and a light source. One or more processors are used to control the light source, to send a reference signal to the lock-in sensor, to process sensor data and to calculate depth maps. For example, at least some of these processors may be included in computer 409.

In the example shown in FIG. 4: A multi-frequency ToF camera 400 takes measurements at multiple, equidistant frequencies. For example, the camera may take measurements at a set of ten frequencies f=10 MHz, 20 MHz, 30 MHz, . . . , 100 MHz. At each frequency, a lock-in sensor within the ToF camera captures 4 frames. From these 4 frames, one or more processors compute, for each pixel in the lock-in sensor, a single complex number which can be expressed in phasor form. Thus, the processors compute one such complex quantity per pixel per frequency. The one or more processors then stack all of such complex quantities (one such complex number per pixel per frequency) and solve for the depth and intensity. Thus, the number of such complex quantities per pixel that are computed depends on the number of frequencies in the sweep.

FIG. 5A is a conceptual diagram that shows complex quantities computed from measurements taken during a frequency sweep. A multi-frequency camera emits a temporal sequence of m different frequencies: $x_1, x_2, \ldots, x_m$. First, it emits frequency $x_1$, then it emits frequency $x_2$, and so on. The frequencies are evenly spaced (in frequency): e.g., 10 MHz, 20 MHz and so on. For each respective frequency in the sequence, a lock-in sensor captures multiple frames (e.g., four frames). From these multiple frames, one or more processors compute a single complex number per pixel for that respective frequency, which complex number can be expressed as a phasor.

In the example shown in FIG. 5A, a set of m complex numbers $(s[1], s[2], \ldots, s[m])$ are indicative of measurements taken by a single pixel during a frequency sweep, for a scene with two different light path lengths. In the example shown in FIG. 5, each of the respective complex quantities $(s[1], s[2], \ldots, s[m])$ is indicative of four sensor measurements taken at a single pixel at a single frequency. For example, complex quantity s[1] is indicative of four measurements of light intensity taken at a single pixel for frequency $X_1$, and complex quantity s[2] is indicative of four measurements of light intensity taken at the same pixel for frequency $x_2$. Further, in the example shown in FIG. 5A, each of the respective complex quantities $(s[1], s[2], \ldots, s[m])$ is the sum of two components, the first component being contributed by light that travels the first path length, and the second component being contributed by the light that travels the second path length. For example, complex quantity $s[1] = \alpha_1 e^{jx_1\phi_1} + \alpha_2 e^{jx_1\phi_2}$, where $\alpha_1$ and $\phi_1$ are the amplitude and phase for the first path length, and $\alpha_2$ and $\phi_2$ are the amplitude and phase for the second path length. (If the first and second paths are single-bounce paths—where light travels directly from the camera to a surface, and then reflects directly back to the camera—then the first and second paths correspond to different scene depths. If the paths are not single-bounce paths, then different path lengths may, but do not necessarily, correspond to different scene depths.)

FIG. 5B is a conceptual diagram that shows a decomposition of global components, even where there are more than two path lengths. In the example shown in FIG. 5B, there are K path lengths. Four measurements are taken at frequency m, and a complex quantity s[m] is calculated. The complex quantity s[m] is a sum of the terms for the respective path lengths:

$$s[m] = \alpha_1 e^{jm\phi_1} + \alpha_2 e^{jm\phi_2} + \alpha_3 e^{jm\phi_3} + \ldots + \alpha_K e^{jm\phi_K}$$

where $\alpha_1, \alpha_2, \ldots, \alpha_K$ are the amplitudes for the respective path lengths, $\phi_1, \phi_2, \ldots, \phi_K$ are the phases for the respective path lengths, and m is the frequency at which these particular measurements were taken.

Figure 6A:
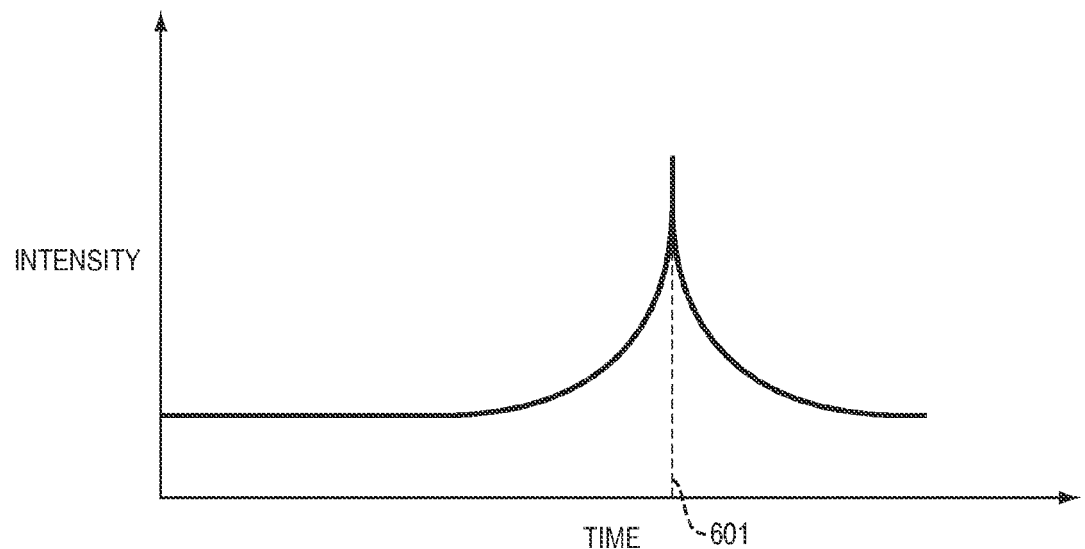
FIG. 6A shows a first plot of intensity versus time.

FIG. 6A shows a first plot of intensity versus time. In the example shown in FIG. 6A, the light reflects directly back from a scene in a single bounce, arriving at time 601.

Figure 6B:
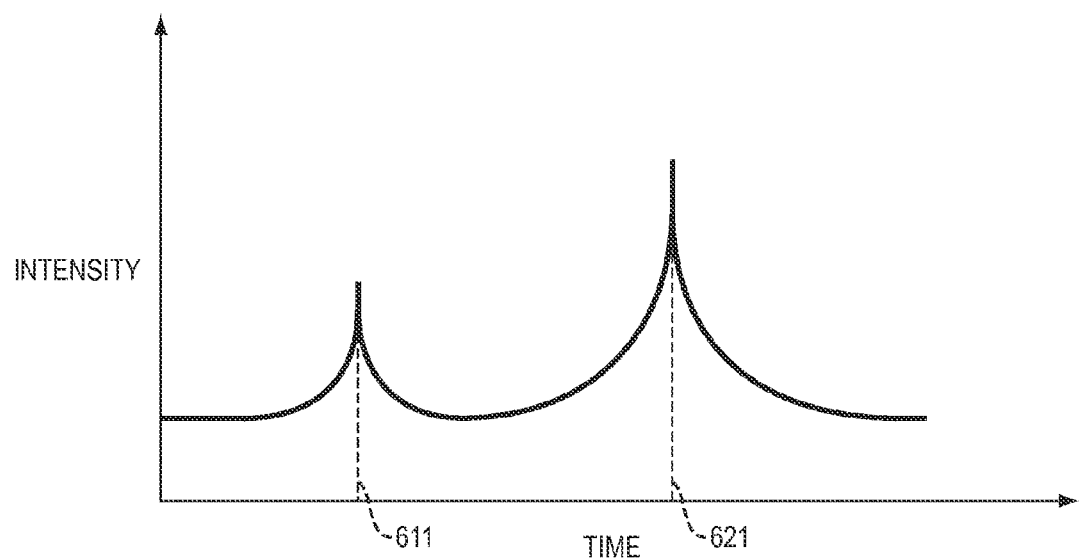
FIG. 6B shows a second plot of intensity versus time.

FIG. 6B shows a second plot of intensity versus time. In the example shown in FIG. 6B, some of the light reflects directly back from a scene in a single bounce, arriving at the lock-in sensor at time 611, and some of the light bounces twice, before arriving at the lock-in sensor at time 621.

Figure 7:
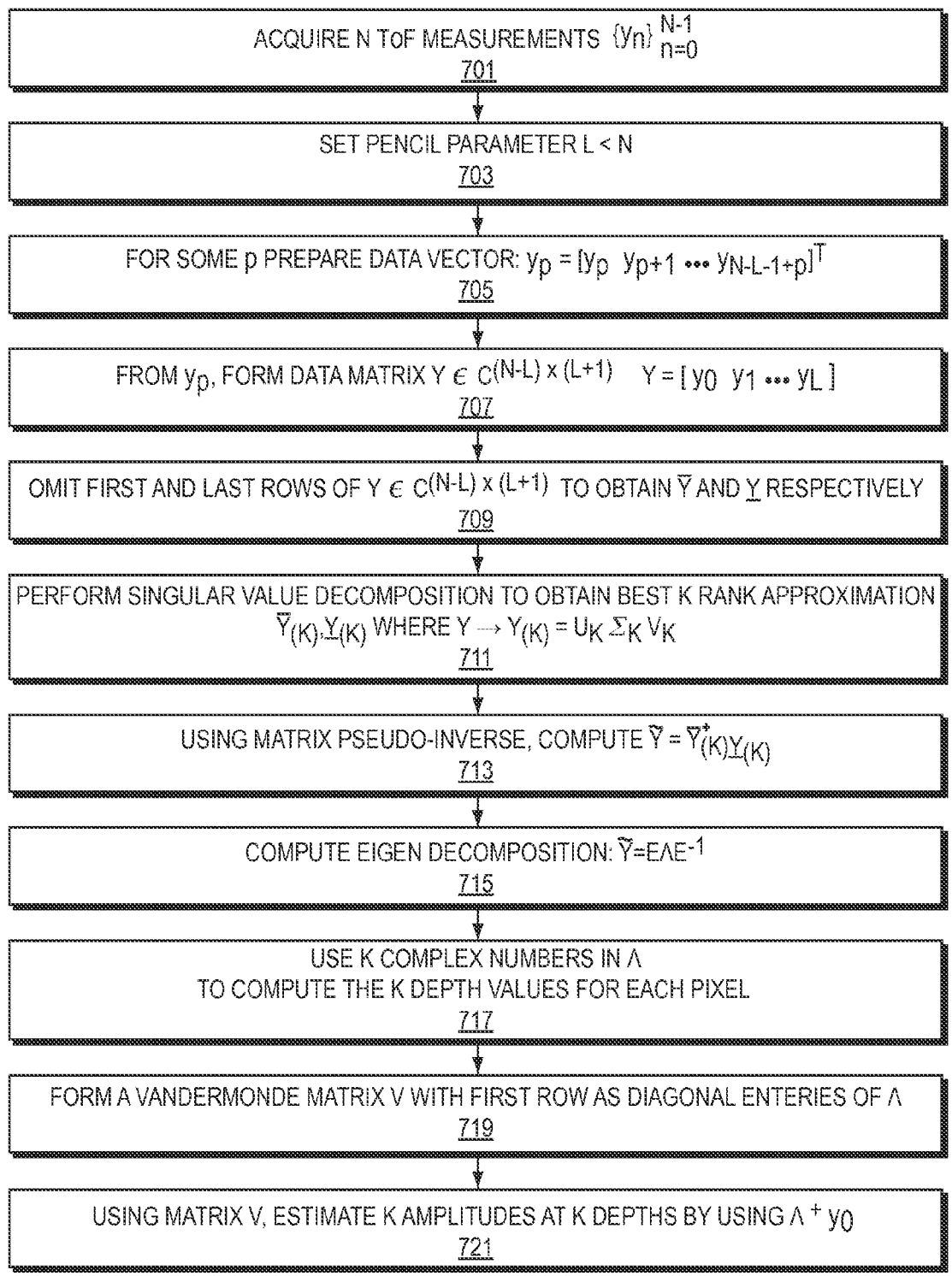
FIG. 7 shows an algorithm used to compute a high resolution estimation of frequency components of a signal.

In some implementations of this invention, starting from noisy measurements, the K-phase values are obtained using the algorithm described in FIG. 7. This algorithm computes a high resolution estimation of frequency components of a signal. In the example shown in FIG. 7, the algorithm comprises the following steps:

Acquire N ToF measurements $\{y_n\}_{n=0}^{N-1}$ (step 701).

Set Pencil Parameter L>N (step 703).

For some p prepare data vector $y_p = [y_p\ y_{p+1}\ \ldots\ y_{N-L-1+p}]^T$ (step 705).

From $y^p$, form data matrix $Y \in \mathbb{C}^{(N-L) \times (L+1)}$ such that $Y = [y_0\ y_1\ y_2\ \ldots\ y_L]$ (step 707).

Omit first and last rows of $Y \in \mathbb{C}^{(N-L) \times (L+1)}$ to obtain $\overline{Y}$ and $\underline{Y}$, respectively (step 709).

Perform singular value decomposition to obtain best K rank approximation $\overline{Y}_{(K)}, \underline{Y}_{(K)}$ where $Y \to Y_{(K)} = U_K \Sigma_K V_K$ (step 711).

Using Matrix Psuedo-inverse, compute $\tilde{Y} = \overline{Y}_{(K)}^\dagger \underline{Y}_{(K)}$ (step 713).

Compute Eigen Decomposition $\tilde{Y} = E\Lambda E^{-1}$, where $\Lambda$ is the diagonal matrix of eigen values. (step 715).

Use the phase of K complex numbers in $\Lambda$ to compute K depth values for each pixel. (step 717).

Form a Vandermonde matrix V with first row as diagonal entries of $\Lambda$ (step 719).

Using matrix V, estimate K amplitudes at K depths by using $\Lambda^\dagger y_0$ (step 721).

In steps 713 and 721 above, "†" means pseudo-inverse. Likewise, in FIG. 7, items 713 and 721, "+" as a superscript to a matrix means pseudo-inverse.

Here is a non-limiting example of software code that can be used in an illustrative implementation of this invention. In this example, the code implements a Matrix-Pencil routine for spectral estimation. The input to the code is the ToF data and K (the number of expected bounces). The output is an amplitude/depth image for each of the K bounces.

```
% Matrix Pencil Method <> Generalized Eigen System
% Ayush Bhandari | ayush@MIT.edu
%--- Uses Forward-Backward Equations
%--- Solves Generalized Eig. Value Problem to seek solutions in Null Space
% data - Data Samples
% time - Time instants where data is recorded
% L    - Window Paramater >= 2K
% K    - No of Phasors
% wk - estimated phases
% xk - estimated amplitudes
function [wk,xk,datarec]=PencilPhase(data, time ,L,K)
Van = @(f,t) meshgrid(f,t).^(meshgrid(t,f)');
% Force Solutions to be in Null Space
%data = hilbert(data);
N=length(data);
% Matrix with window length L
Y0=zeros(N-L,L);
Y1=zeros(N-L,L);
for i=0:N-L-l
    Y0(i+1,:)=data((1:L)+i);
    Y1(i+1,:)=data((2:L+1)+i);
end
Y0FwdBwd=[Y0; conj(Y1(:,end:-1:1))];
Y1FwdBwd=[Y1; conj(Y0(:,end:-1:1))];
Y0=Y0FwdBwd;
Y1=Y1FwdBwd;
% Best K - rank approximation
[U,S,V]=svd(Y1);
S1=S(1:K,1:K);
U1=U(:,1:K);
V1=V(:,1:K);
[U,S,V]=svd(Y0);
S0=S(1:K,1:K);
```

```
U0=U(:,1:K);
V0=V(:,1:K);
% K-term truncation
Y0=U0*S0*V0';
% Solve for Eigen Values
% Pseudo-Inverse for K-term Truncation
P = V1*inv(S1)*U1';
% Gen. Eig. Value Problem
z=eig(P*Y0);
% Put Back Phases
[Val,Idx]=sort(abs(z));
wk=sort(mod((-angle(z(Idx(end-K+1:end)))),2*pi))./mean(diff(time));
% Solve Least-Squares Inverse for Vandermonde
xk = Van(exp(1i*wk),time)\data;
%Reconstruct Data
datarec = Van(exp(1i*wk),time)*xk;
end
```

In exemplary implementations, the light intensity contributed each different path length can be determined by estimating weights and harmonics of a non-harmonic Fourier sum. This is a non-linear problem. However, in the context of time-of-flight depth measurements, the problem can be solved by an algorithm that calculates a high resolution estimation of frequency components of a signal.

In exemplary implementations of this invention, one or more processors perform an algorithm to calculate a high resolution estimation of frequency components of a signal. For example, the algorithm may employ any of the following spectral estimation techniques: (a) matrix pencils; (b) Prony's Method; (c) MUSIC (multiple signal characterization), including spectral MUSIC and root MUSIC; (d) subspace rotation invariance methods, including ESPRIT (estimation of signal parameters by rotational invariance techniques), (e) maximum likelihood methods, including IQML (iterative quadratic maximum likelihood), UML (unconditional maximum likelihood), and CML (conditional maximum likelihood); (f) any other parametric method of spectral estimation; or (g) any other method of line spectral estimation.

In illustrative implementations of this invention, solving for unknown path-lengths of multiple paths has practical advantages. For example, indirect or higher-order paths can be discarded, and the direct, first-order component can be used to generate accurate range maps. Or, for example, indirect paths can be exploited, including in the following applications: (a) looking through a diffuser; (b) imaging of tissue; or (c) imaging in a scattering medium.

In exemplary implementations of this invention, one or more electronic processors are specially adapted: (1) to control the operation of hardware components of a multi-frequency ToF camera, including any light sensor (including any lock-in sensor) any light source, and any driver; (2) to cause the ToF camera to perform a frequency sweep, in which the ToF camera emits a temporal sequence of different frequencies; (3) to compute a phasor from a set of multiple sensor measurements at a given frequency; (4) to perform spectral analysis computations; (5) to compute a high resolution estimation of frequency components of a signal; (6) to perform an algorithm to estimate phase and amplitude for each respective light path length of light incident on a pixel of a light sensor; (7) to receive signals indicative of human input, (8) to output signals for controlling transducers for outputting information in human perceivable format, and (9) to process data, perform computations, and control the read/write of data to and from memory devices. The one or more processors may be located in any position or position within or outside of the ToF camera. For example: (a) at least some of the one or more processors may be embedded within or housed together with other components of the ToF camera, such as a lock-in sensor; (b) at least some of the one or more processors may be located in an integrated circuit (e.g., a microcontroller or field-programmable gate array) that controls the light source and sends a reference signal to a lock-in sensor; and (c) at least some of the one or more processors may be located in a computer remote from other components of the ToF camera. The one or more processors may be connected to each other or to other components in the ToF camera either: (a) wirelessly, (b) by wired connection, or (c) by a combination of wired and wireless connections. For example, one or more electronic processors may be housed in a computer (e.g., 311, 409). Or, for example, one or more electronic processors may be housed in an integrated circuit (e.g., 301).

DEFINITIONS

Here are a few definitions and clarifications. As used herein:

The terms "a" and "an", when modifying a noun, do not imply that only one of the noun exists.

The term "comprise" (and grammatical variations thereof) shall be construed broadly, as if followed by "without limitation". If A comprises B, then A includes B and may include other things.

"Defined Term" means a term that is set forth in quotation marks in this Definitions section.

The term "comprise" (and grammatical variations thereof) shall be construed broadly, as if followed by "without limitation". If A comprises B, then A includes B and may include other things.

As used herein, a "direct" component of light means a component of light that travels directly from a light source to a scene point, and then directly from the scene point to a light sensor. A direct component of light undergoes only one reflection as it travels from the light source to the light sensor. That one reflection occurs when the light reflects off of the scene point.

The term "e.g." means for example.

The acronym ESPRIT means the Estimation of Signal Parameters by Rotational Invariance Techniques method of spectral estimation.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes "a third" thing, a "fourth" thing and so on shall be construed in like manner.

The term "for instance" means for example.

As used herein, a "global" component of light means a component of light that travels directly from a light source to a first scene point, and then travels to one or more other scene points, before traveling to a light sensor.

The terms "horizontal" and "vertical" shall be construed broadly. For example, "horizontal" and "vertical" may refer to two arbitrarily chosen coordinate axes in a Euclidian two dimensional space, regardless of whether the "vertical" axis is aligned with the orientation of the local gravitational field. For example, a "vertical" axis may oriented along a local surface normal of a physical object, regardless of the orientation of the local gravitational field.

The term "include" (and grammatical variations thereof) shall be construed broadly, as if followed by "without limitation".

Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure and radiant energy density.

The term "light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

A "multiple-bounce path" means a path traveled by a global component of light.

To "multiply" includes to multiply by an inverse. Thus, to "multiply" includes to divide.

The acronym "MUSIC" means the MUultiple SIgnal Characterization method of spectral estimation.

The term "or" is inclusive, not exclusive. For example A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or can be ignored.

The term "path length" means the total distance traveled by light in a path that starts at a light source and ends at a light sensor and that includes one or more reflections between the start and end of the path.

To compute a term that "satisfies" an equation: (a) does not require that calculations involve terms, variables or operations that are in the equation itself, as long as the term itself (subject to error, as described in part (b) of this sentence) is computed; and (b) includes computing a solution that differs from a correct solution by an error amount, which error amount arises from one or more of (i) rounding, (ii) other computational imprecision, including error due to modeling a continuous signal by a discrete signal or due to using an insufficiently small step size in calculations, and (iii) signal noise or other physical limitations of sensors or other physical equipment.

As used herein, the term "set" does not include a so-called empty set (i.e., a set with no elements).

A "single-bounce path" means a path traveled by a direct component of light.

As used herein, a "subset" of a set consists of less than all of the elements of the set.

The term "such as" means for example.

The term "ToF" means time-of-flight.

Spatially relative terms such as "under", "below", "above", "over", "upper", "lower", and the like, are used for ease of description to explain the positioning of one element relative to another. The terms are intended to encompass different orientations of an object in addition to different orientations than those depicted in the figures.

A matrix may be indicated by a bold capital letter (e.g., D). A vector may be indicated by a bold lower case letter (e.g., α). However, the absence of these indicators does not indicate that something is not a matrix or not a vector.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. In each case described in this paragraph, Applicant is acting as Applicant's own lexicographer.

Variations

This invention may be implemented in many different ways, in addition to those described above.

Here are some non-limiting examples of how this invention may be implemented:

This invention may be implemented as a method comprising, in combination: (a) using a light source to emit light in a temporal sequence of frequencies, such that (i) the light illuminates a scene, (ii) reflected light from the scene reaches a light sensor, and (iii) a first frequency is emitted during a first period of time in the sequence and not during other periods of time during the sequence, a second frequency is emitted during a second period of time in the sequence and not during other periods of time during the sequence, and a third frequency is emitted during a third period of time in the sequence and not during other periods of time during the sequence; (b) using a light sensor to capture multiple frames for each respective frequency in the sequence; and (c) using one or more processors (i) to analyze data in the frames and (ii) to calculate a set of complex numbers for each respective pixel in the light sensor, such that the set of complex numbers includes a complex number for each respective frequency in the sequence for each respective path length in a set of path lengths, wherein the set of path lengths consists of path lengths of paths of light that end at the respective pixel. Furthermore: (1) the method may further comprise using the one or more processors to calculate a depth map of the scene; (2) the paths of light may include a single-bounce path; (3) the paths of light may include a multiple-bounce path; (4) the light sensor may comprise a lock-in sensor; (5) the light sensor may capture four frames for each respective frequency in the sequence of frequencies; (6) the one or more processors may calculate multiple components of light incident on a single pixel of the light sensor, each respective component, out of the multiple components, comprising light that travels a particular path length, out of the set of path lengths; (7) the algorithm may include steps for computing frequency components of a signal; (8) the algorithm may include a matrix pencil computation; (9) the algorithm may include a computation that uses Prony's Method; (10) the algorithm may include a computation that uses a MUSIC method of spectral estimation; (11) the algorithm may include a computation that uses a maximum likelihood method of spectral estimation; (12) the algorithm may include a computation that uses an ESPRIT method of spectral estimation; and (13) the algorithm may include a computation that uses a parametric method of spectral estimation.

This invention may be implemented as a method of determining a depth map of a scene using a time-of-flight camera, which camera includes a light sensor, the improvement comprising: (a) using a light source to emit light in a temporal sequence of frequencies to illuminate the scene, such that a first frequency is emitted during a first period of time in the sequence and not during other periods of time during the sequence, a second frequency is emitted during a second period of time in the sequence and not during other periods of time during the sequence, and a third frequency is emitted during a third period of time in the sequence and not during other periods of time during the sequence; and (b) using one or more processors to estimate a phase and coefficient of reflection for each respective pixel of the light sensor for each respective path length, out of a set of path lengths of light, each respective path length being for a path that starts at the light source and ends at the light sensor.

This invention may be implemented as a time-of-flight camera, which camera includes a light sensor, the improvement comprising: one or more light sources for emitting light in a temporal sequence of different frequencies, such that a first frequency is emitted during a first period of time in the sequence and not during other periods of time during the sequence, a second frequency is emitted during a second period of time in the sequence and not during other periods of time during the sequence, and a third frequency is emitted during a third period of time in the sequence and not during other periods of time during the sequence. Furthermore: (1) the improvement may further comprise one or more processors programmed to estimate a phase and coefficient of reflection for each respective pixel of the light sensor for each respective path length, out of a set of path lengths of light, each respective path length being for a path that starts at the light source and ends at the light sensor; (2) the one or more processors may be further programmed to calculate a depth map of a scene; (3) the one or more processors may be further programmed to identify a direct component of light incident on a pixel of the sensor; and (4) the one or more processors may be further programmed to identify a global component of light incident on a pixel of the sensor.

CONCLUSION

While exemplary implementations are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also within the scope of the present invention. Numerous modifications may be made by one of ordinary skill in the art without departing from the scope of the invention.

What is claimed is:

1. A method comprising, in combination:
    (a) using a light source to emit light in a temporal sequence of frequencies, such that
        (i) the light illuminates a scene,
        (ii) reflected light from the scene reaches a light sensor, and
        (iii) a first frequency is emitted during a first period of time in the sequence and not during other periods of time during the sequence, a second frequency is emitted during a second period of time in the sequence and not during other periods of time during the sequence, and a third frequency is emitted during a third period of time in the sequence and not during other periods of time during the sequence;
    (b) using a light sensor to capture multiple frames for each respective frequency in the sequence; and
    (c) using one or more processors
        (i) to analyze data in the frames and
        (ii) to calculate a set of complex numbers for each respective pixel in the light sensor, such that the set of complex numbers includes a complex number for each respective frequency in the sequence for each respective path length in a set of path lengths, wherein the set of path lengths consists of path lengths of paths of light that end at the respective pixel.

2. The method of claim 1, wherein the method further comprises using the one or more processors to calculate a depth map of the scene.

3. The method of claim 1, wherein the paths of light include a single-bounce path.

4. The method of claim 1, wherein the paths of light include a multiple-bounce path.

5. The method of claim 1, wherein the light sensor comprises a lock-in sensor.

6. The method of claim 1, wherein the light sensor captures four frames for each respective frequency in the sequence of frequencies.

7. The method of claim 1, wherein the one or more processors calculate multiple components of light incident on a single pixel of the light sensor, each respective component, out of the multiple components, comprising light that travels a particular path length, out of the set of path lengths.

8. The method of claim 1, wherein the algorithm includes steps for computing frequency components of a signal.

9. The method of claim 1, wherein the algorithm includes a matrix pencil computation.

10. The method of claim 1, wherein the algorithm includes a computation that uses Prony's Method.

11. The method of claim 1, wherein the algorithm includes a computation that uses a MUSIC method of spectral estimation.

12. The method of claim 1, wherein the algorithm includes a computation that uses a maximum likelihood method of spectral estimation.

13. The method of claim 1, wherein the algorithm includes a computation that uses an ESPRIT method of spectral estimation.

14. The method of claim 1, wherein the algorithm includes a computation that uses a parametric method of spectral estimation.

15. A method of determining a depth map of a scene using a time-of-flight camera, which camera includes a light sensor, THE IMPROVEMENT COMPRISING:
    (a) using a light source to emit light in a temporal sequence of frequencies to illuminate the scene, such that a first frequency is emitted during a first period of time in the sequence and not during other periods of time during the sequence, a second frequency is emitted during a second period of time in the sequence and not during other periods of time during the sequence, and a third frequency is emitted during a third period of time in the sequence and not during other periods of time during the sequence; and (b) using one or more processors to estimate a phase and coefficient of reflection for each respective pixel of the light sensor for each respective path length, out of a set of path lengths of light, each respective path length being for a path that starts at the light source and ends at the light sensor.

16. A time-of-flight camera, which camera includes a light sensor,

THE IMPROVEMENT COMPRISING:

(a) one or more light sources for emitting light in a temporal sequence of different frequencies, such that a first frequency is emitted during a first period of time in the sequence and not during other periods of time during the sequence, a second frequency is emitted during a second period of time in the sequence and not during other periods of time during the sequence, and a third frequency is emitted during a third period of time in the sequence and not during other periods of time during the sequence; and (b) one or more processors programmed to estimate a phase and coefficient of reflection for each respective pixel of the light sensor for each respective path length, out of a set of path lengths of light, each respective path length being for a path that starts at the light source and ends at the light sensor.

17. The time-of-flight camera of claim 16, wherein the one or more processors are further programmed to calculate a depth map of a scene.

18. The time-of-flight camera of claim 16, wherein the one or more processors are further programmed to identify a direct component of light incident on a pixel of the sensor.

19. The time-of-flight camera of claim 16, wherein the one or more processors are further programmed to identify a global component of light incident on a pixel of the sensor.

* * * * *